United States Patent

Wada et al.

[15] 3,655,910

[45] Apr. 11, 1972

[54] A MAGNETIC RECORDING, REPRODUCING, AND EDITING APPARATUS

[72] Inventors: Yoshiyo Wada; Katsuya Yasutake, both of Yokohama, Japan

[73] Assignee: Victor Company of Japan, Limited, Yokohama, Japan

[22] Filed: Aug. 12, 1969

[21] Appl. No.: 849,318

[30] Foreign Application Priority Data

Aug. 13, 1968 Japan ..................................43/57115

[52] U.S. Cl. ....................................178/6.6 A, 179/100.2 B
[51] Int. Cl. ......................................G11b 27/02, H04n 5/78
[58] Field of Search ............................179/100.2 B, 100.2 T; 178/6.6 A

[56] References Cited

UNITED STATES PATENTS

| | | | |
|---|---|---|---|
| 2,952,737 | 9/1960 | Friess | 178/6.6 A |
| 3,257,504 | 6/1966 | Bounsall | 179/100.2 B |
| 3,342,932 | 9/1967 | Bounsall | 178/6.6 A |
| 3,461,248 | 8/1969 | Kane | 179/100.2 B |

*Primary Examiner*—Bernard Konick
*Assistant Examiner*—Steven B. Pokotilow
*Attorney*—Louis Bernat

[57] ABSTRACT

A magnetic recording and reproducing apparatus in which a cue signal or other detection pulse signal is recorded on a magnetic tape. The cue signal marks a timing point for editing signals recorded on the magnetic tape, while the movement of the magnetic tape is temporarily stopped. A recorded detection pulse signal is reproduced at a relative speed, with respect to the tape speed, in editing the signals while the magnetic tape is moving. Thus, the editing point can be detected positively and easily.

4 Claims, 9 Drawing Figures

Patented April 11, 1972 3,655,910

2 Sheets-Sheet 1

INVENTORS
YOSHIYO WADA
KATSUYA YASUTAKE
BY Louis Bernat
ATTORNEY

INVENTORS
YOSHIYO WADA
KATSUYA YASUTAKE
BY Louis Bernat
ATTORNEY

A MAGNETIC RECORDING, REPRODUCING, AND EDITING APPARATUS

The present invention relates to magnetic recording and reproducing systems. More particularly, the invention is concerned with a magnetic recording and reproducing system which enables an editing of images and sounds for a magnetic recording and reproducing apparatus which magnetically and successively records and reproduces video signals and other high frequency signals by using a plurality of magnetic heads mounted on a rotary body, for effecting oblique scanning of a magnetic medium.

Generally, one type of magnetic recording and reproducing apparatus known in the art uses two magnetic heads mounted and disposed in positions diametrically opposed to each other on the edge of a rotary body, rotating in the center of a guide drum of substantially cylindrical shape, these heads are used to record high frequency signals, such as video signals, for example, on a magnetic tape. The tape passes obliquely around the guide drum for a distance corresponding to more than one-half the circumference thereof. The heads also reproduce the signals therefrom. Each of the magnetic heads alternately records and reproduces at least one field or one frame of a video signal in a sufficiently long magnetic track laid obliquely with respect to the longitudinal axis of the tape. When a sound signal is recorded, by editing, on a magnetic tape on which video signals are already recorded, the magnetic tape is moved on the apparatus prior to editing, to reproduce a recorded image and select a suitable editing point. A cue signal is first recorded on the moving magnetic tape as a signal for detecting the editing point. Then, the magnetic tape is moved again, to reproduce and detect the cue signal. To effect the editing, the sound recording starts at this point.

This system uses, as a cue signal, sine wave which cannot be recorded unless the magnetic tape is moving. Also, the system cannot reproduce a signal to generate an output unless the signal has been recorded on the tape while it is moving. Thus, the recording of a cue signal in this system must be effected while the magnetic tape is moving. Because of this, this system has disadvantages. Since the recording of a cue signal is effected while the magnetic tape is moving, he exact point at which a sound is to be recorded on the magnetic tape with respect to an associated image passes quickly. This makes necessary to repeatedly run the same magnetic tape many times in order to accurately position the cue signal. Moreover, a deviation in time of the sound recorded on the tape from the image recorded thereon must be tolerated. Thus, a highly advanced skill is required to effect recording of a sound by editing in this system.

The present invention obviates these disadvantages of the prior art system. According to this invention, a magnetic tape is temporarily stopped to record thereon a detection pulse signal or cue signal at an exact point in which the editing of the signals already recorded on the tape is to be effected. This detection pulse signal is reproduced at a relative speed, with respect to the tape speed, by moving the magnetic tape when editing is effected. Thus, the editing point can be detected very accurately.

Accordingly, an object of the present invention is to provide a magnetic recording and reproducing system which accurately and readily effect, the editing of an image and a sound.

Another object of the invention is to provide a magnetic recording and reproducing system which facilitates a selection on the moving magnetic tape of an editing point—very accurately—and to record and reproduce a detection pulse signal or cue signal in the selected point.

Another object of the invention is to provide a magnetic recording and reproducing system in which the moving magnetic tape is stopped after an editing point is selected to record a detection pulse signal or cue signal in the selected point. The recorded detection pulse signal is reproduced at a relative speed, with respect to the tape speed, while the magnetic tape is moving so as to detect the editing point where the editing of the signals is effected.

Additional objects as well as features and advantages of the invention will become evident from the description set forth hereinafter when considered in conjunction with the accompanying drawings, in which.

Figure 1:
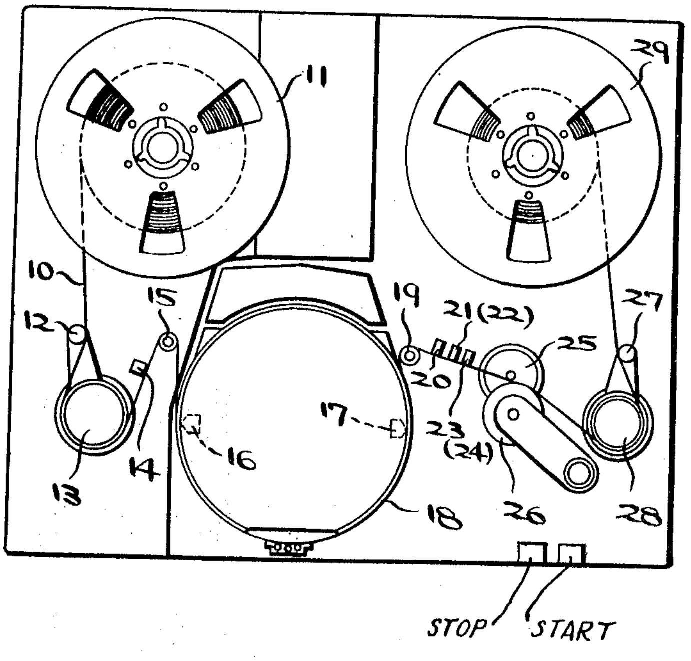
FIG. 1 is a plan view of one embodiment of the video signal magnetic recording and reproducing apparatus in which the system according to this invention can be incorporated.

FIG. 1 shows a video signal magnetic recording and reproducing apparatus, in which the system according to this invention can be incorporated. A magnetic tape 10 is pulled from a supply reel 11 and moved past a roller 13 having a first tension arm 12. Then the tape is brought into contact with a fixed magnetic cue signal reproducing head 14 for reproducing a cue signal. For example, these cues may be recorded in the direction of movement of the tape in the upper portion or lower portion thereof. Thereafter, the tape is moved past a first guide roller 15, and around a cylindrical guide drum 18 in an oblique wrap for a distance corresponding to over one-half the circumference thereof. The guide drum has built-in rotary magnetic head means comprising two magnetic recording and reproducing heads 16 and 17, for example, for recording and reproducing video signals.

The magnetic tape is then moved past a second guide roller 19 and brought into contact with a fixed magnetic control signal recording and reproducing head 20, for recording and reproducing control signals which are recorded in the direction of movement of the tape in either the upper or lower marginal portion of the tape. Next, the tape is brought into contact with a fixed magnetic sound signal erasing head 21 and a fixed magnetic cue signal erasing head 22, for erasing a sound signal. A cue signal is recorded in the direction of movement of the tape in the upper portion and lower portion (or in the lower portion and upper portion) of the tape respectively. The tape is brought into contact with a fixed magnetic sound signal recording and reproducing head 23 for recording and reproducing a sound signal recorded in the direction of movement of the tape in the upper or lower portion of the magnetic tape. A fixed magnetic cue signal recording head 24 is mounted in the same block as said magnetic head 23 for recording a cue signal in the direction of movement of the tape in the lower or upper portion of the magnetic tape. The tape is held between a pinch roller 26 and a capstan 25 driven by a capstan motor rotating at a constant rate of revolution determined by a given frequency of a power source. The tape is moved past a roller 28 having a second tension arm 27, and wound on a take-up reel 29 adapted to rotate in the direction of arrow X at a constant rate at all times.

The rotary magnetic head means built-in the guide drum 18 comprises a pair of magnetic video signal recording and reproducing heads 16 and 17, disposed in positions diametrically opposed to each other on the peripheral surface of a rotary body. The body is rotatable on a shaft which is coaxial with the rotary shaft of a rotary magnetic head drive motor (not shown), and positioned in a plane normal to the center line of the guide drum 18, which coincides with said rotary shaft of the drive motor.

Figures 2, 4A, 4B, 4C, 4D, 4E:
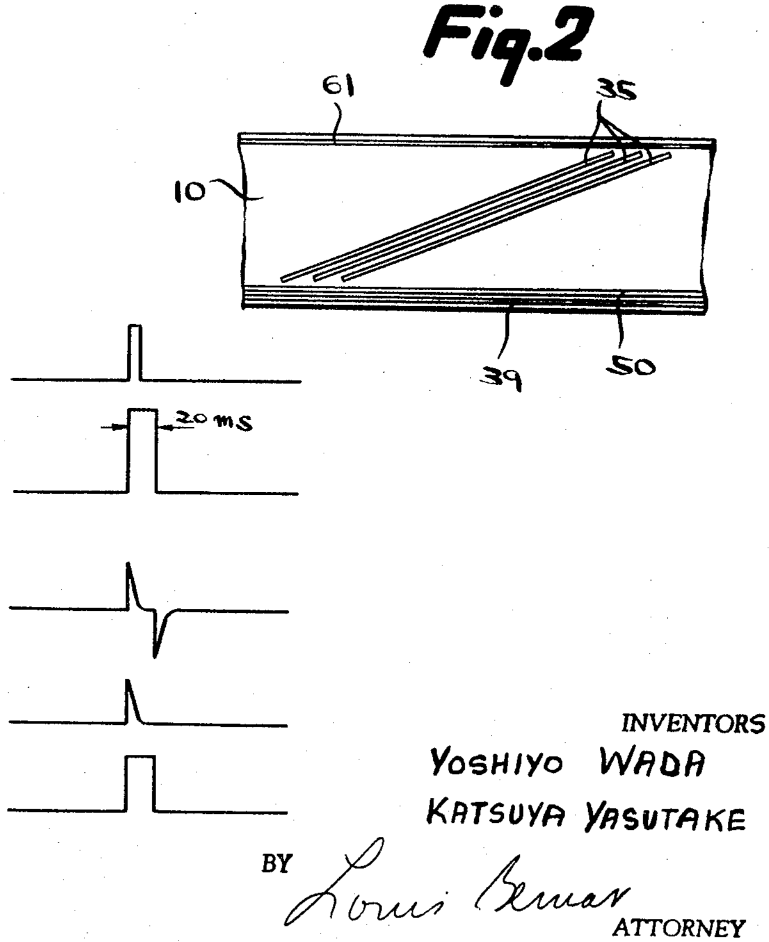
FIG. 2 is a pattern diagram showing one embodiment of magnetic tracks laid on a magnetic tape in the system according to this invention.
FIGS. 4A to 4E show wave forms of signals appearing in essential portions of the block diagram of FIG. 3B.
Figure 3A:
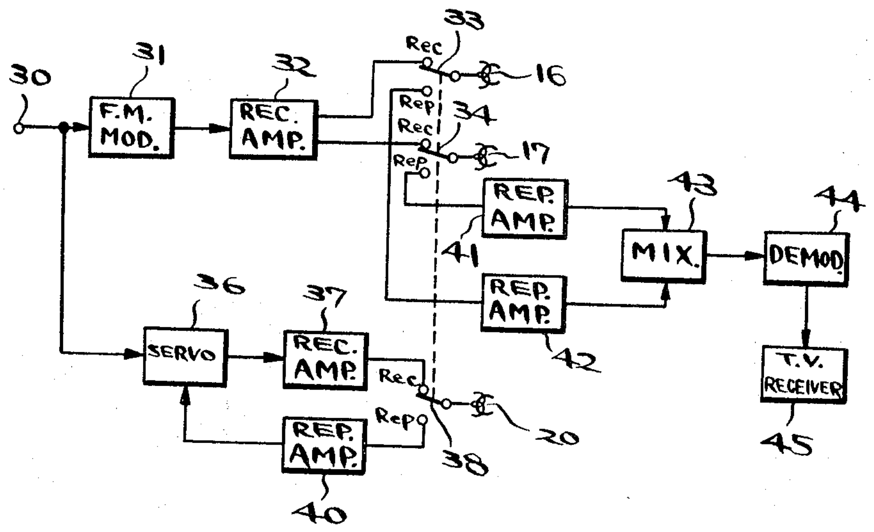
FIGS. 3A and 3B are systematic block diagrams of one embodiment of the system according to this invention.

The operation of recording a video signal will first be explained. As shown in FIGS. 1 to 3, a video signal is applied to an input terminal 30 of FIG. 3(A) and is frequency modulated at a frequency modulator 31. The frequency modulated wave signal is amplified at a recording amplifier 32 After amplification, the FM signal is passed through coupled switches 33 and 34, which are in engagement with contacts on the recording side. The signal is transmitted to the magnetic video signal recording and reproducing heads 16 and 17, which record the signal in video signal tracks 35 on the magnetic tape 10 passed around the guide drum 18, obliquely with respect to the center line of the guide drum. The video signal tracks 35 are laid obliquely with respect to the longitudinal axis of the magnetic tape as shown in FIG. 2.

On the other hand, the video signal is also supplied to a servo mechanism 36 where a vertical synchronizing signal of 60 $H_z$ is separated from the video signal and divided into pulses of 30 $H_z$ at a one-half frequency divider. These pulses are amplified as a control signal at a recording amplifier 37. After being passed through a switch 38 (coupled) to said switches 33 and 34 in engagement with a contact of the recording side, these signals are supplied to the fixed magnetic control signal recording and reproducing head 20. The fixed magnetic control signal recording and reproducing head 20 records the control signal in a track 39 in the upper marginal or lower marginal of the magnetic tape as seen across the width of the tape (in the lower marginal portion in the embodiment described) as shown in FIG. 2.

Accordingly, the video signal and the control signal recorded on the magnetic tape 10 are in a fixed relation to each other.

In a playback operation, the magnetic control signal recording and reproducing head 20 traces the control signal track 39 (FIG. 2) on the magnetic tape to reproduce the control signal which is transmitted to the servo mechanism 36 through the switch 38, while it is brought into engagement with a contact Rep. on the reproducing side. Then the signal is applied to amplifier 40.

The recording of a cue signal will now be explained. Prior to the recording of a cue signal on the magnetic tape 10, a video signal is reproduced from the video signal tracks 35 (FIG. 2) on the magnetic tape 10 by the magnetic video signal recording and reproducing heads 16 and 17 in a first step. The reproduced video signal is passed through the switch 33 and 34 brought into engagement with contacts Rep. on the reproducing side and then amplified at reproducing amplifiers 41 and 42. Then, after being passed through a mixer 43 and frequency demodulated at a frequency demodulator 44, the video signal is reproduced to produce a picture on a monitor television set 45.

Figure 3B:
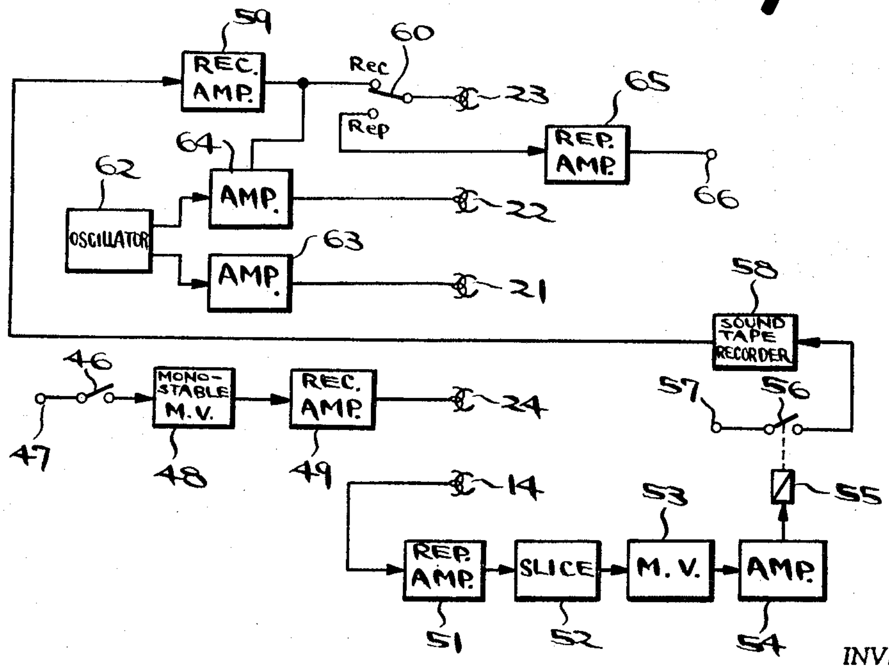

The magnetic tape 10 is caused to move at a lower rate in the neighborhood of a point at which editing is to be effected, to reproduce the signal in a slow motion in a second step. A desired editing point is selected while the operator watches the slow motion picture. After the desired editing point has been selected, the movement of the magnetic tape 10 is terminated, in a third step. A timing key 46, shown in FIG. 3B, is pushed while the operator is watching the reproduced still picture for confirmation of the editing point. This causes timing key pulses, as shown in FIG. 4A, to be formed by a direct current supplied to a terminal 47. The timing pulses actuate a monostable multivibrator 48 to produce a rectangular pulse wave with a pulse width of 20 milliseconds, shown in FIG. 4B, which constitutes a cue signal. After being amplified at a recording amplifier 49, the rectangular pulse wave is supplied to the cue signal recording magnetic head 24. Since the cue signal is formed by the monostable multivibrator 48, the pulse signal current flows to the magnetic head 24 for a constant time interval irrespective of the duration of the interval of time during which the timing key 46 is pushed.

A magnetic field is formed on the magnetic gap face during the time while the pulse signal current is passed to the cue signal recording magnetic head 24, to thereby magnetize the magnetic tape 10. Thus, a cue signal track 50, shown in FIG. 2, is formed on the stationary magnetic tape 10, by the magnetic field which corresponds to the length of the magnetic head gap. In the embodiment described, the recorded rectangular pulse wave is a normal direction wave. However, it is to be understood that the polarity of the current may be reversed. If this is the case, the polarity of the magnetic field to be recorded will naturally be reversed.

The reproducing of the cue signal recorded in the cue signal track 50 on the magnetic tape 10 will now be explained.

The magnetic tape 10 is rewound on the supply reel 11 and caused to move, so as to reproduce the cue signal from the cue signal track 50. Reproduction of the magnetic cue signal is by a reproducing head 14 mounted in a position nearer to the supply reel than the position in which the cue signal recording magnetic head 24 is mounted.

The reproduced output of the cue signal reproducing magnetic head 14 is a differentiated pulse wave shown in FIG. 4C. Since it has a positive pulse and a negative pulse, it is amplified at a reproducing amplifier 51. Then the negative pulse is removed by slicing at a slicing circuit 52 to provide a pulse wave shown in FIG. 4D which actuates a multivibrator 53.

The output signal of the multivibrator 53, which is a rectangular pulse wave shown in FIG. 4E, is amplified at an amplifier 54 and then actuates a relay 55. The multivibrator 53 has a time constant such that it is held for a sufficiently long time interval (20 milliseconds) to operate the relay 55.

Upon actuation of the relay 55, a relay switch 56 is closed. Another tape recorder 58 has a sound signal already recorded thereon. It is connected to a power source through a terminal 57 so that the tape recorder 58 begins to reproduce the sound signal. The reproduced sound signal is amplified at a recording amplifier 59. After being passed through a change-over switch 60, brought into engagement with a contact Rec. on the recording side, the signal is supplied to the sound signal recording and reproducing magnetic head 23. Head 23 records the sound signal in a sound signal track 61 on the magnetic tape 10, thereby finishing editing.

Simultaneously, as the sound signal is recorded on the magnetic tape 10, the output of an oscillator 62 is amplified at amplifiers 63 and 64 and supplied to the magnetic sound signal erasing head 21 and magnetic cue signal erasing head 22. The heads 21, 22 are mounted in a position nearer to the tape supply reel than the position in which the magnetic sound signal recording and reproducing head 23 and magnetic cue signal recording head 24 are mounted. The heads 21, 22 magnetically erase tracks 50 and 61, prior to recording the sound signal on the magnetic tape 10.

The tape recorder 58 operates with a certain build-up time after the relay 55 is actuated. Wow and flutter occur particularly in the initial stages of the build-up time. The magnetic cue signal reproducing head 14 is mounted in a position which is nearer to the tape supply reel than the position in which the magnetic sound signal recording and reproducing head 23 and magnetic cue signal recording head 24 are mounted. This enables the sound signal to be recorded in a predetermined editing point after the power of the tape recorder has risen to a level sufficiently high to perform a playback operation in a stable manner.

To attain this end, the magnetic cue signal reproducing head 14 is mounted such and the timing of the building-up of the tape recorder 58 is selected such that the operation of the tape recorder 58 actuated by a cue signal reproduced by the magnetic cue signal reproducing head 14. The tape recorder is stabilized only after the cue signal has come to the position of the magnetic sound signal recording head 23. Thus, the sound signal reproduced from the tape recorder 58 can be recorded on the magnetic tape in conformity with the content of the video signal.

In reproducing the magnetic tape 10 that has been edited, the video signal tracks 35 on the magnetic tape 10 are traced by the rotary magnetic heads 16 and 17 shown in FIG. 3A. To take out a reproduced video signal, the switches 33 and 34 are brought into engagement with contacts Rep. on the reproducing side. The video signal is reproduced to provide a picture on the monitor television set 45. At the same time, the sound signal track 61 on the magnetic tape 10 is traced by the magnetic sound signal recording and reproducing head 23 shown in FIG. 3B. To take out a reproduced sound signal, the switch 60 brought into engagement with a contact on the reproducing side. The reproduced sound signal is amplified at a reproducing amplifier 65 and taken out through an output terminal 66 as a reproduced sound output signal which reproduces sound in conformity with the reproduced picture.

In cases where the content of a video signal is recorded in detail for each cut, it is possible to edit and prepare a program in which the so-called pop-out positions of the picture and sound are indexed with one another by recording a cue signal for each cut and successively repeating the aforementioned operation.

While the invention has been described with reference to a preferred embodiment thereof, it is to be understood that the invention is not limited to the specific form of the embodiment and that many modifications and changes may be made therein without departing from the spirit and scope of the invention.

What is claimed is:

1. A magnetic recording and reproducing system comprising magnetic video signal recording and reproducing means including two magnetic heads mounted on the peripheral edge of a rotary body, means for starting and stopping said last named means, means responsive to said starting for moving magnetic tape from a supply reel along a predetermined helical path adjacent said rotary body, means for rotating said rotary body so that said magnetic heads trace parallel oblique tracks with respect to the longitudinal axis of said magnetic tape, said heads and tape moving at relative speeds such that at least one field of video signal is recorded on each track, a fixed magnetic sound signal recording and reproducing head, means for manually terminating the motion of said magnetic tape by operating said stopping means at a position selected relative to signals previously recorded thereon where editing signals are to be recorded on said magnetic tape, means for generating a single pulse signal, a fixed magnetic cue signal recording head, means comprising said fixed magnetic cue signal head for recording said single pulse signal as a cue signal on at least one marginal portion of the stopped magnetic tape, a fixed magnetic cue signal reproducing head disposed at a position which is closer to the supply reel than the position at which said fixed magnetic cue signal recording head and said fixed magnetic sound signal recording and reproducing head are disposed, means comprising said cue signal reproducing head for reproducing the recorded cue signal while the magnetic tape is being moved past said fixed magnetic cue signal reproducing head, and sound signal recording means including said fixed magnetic sound signal recording and reproducing head operated responsive to the reproduced cue signal for recording said editing signals at said selected position, said recording being made on said magnetic tape while it is moving.

2. A magnetic recording and reproducing system comprising magnetic video signal recording and reproducing apparatus including two magnetic heads mounted on the peripheral edge of a rotary body, means for moving magnetic tape from a supply reel along a predetermined helical path adjacent said rotary body, means for manually starting and stopping said tape movement, means for rotating said rotary body so that said magnetic heads trace parallel oblique tracks with respect to the longitudinal axis of said magnetic tape, said heads and tape moving at speeds relative to each other so that at least one field of video signal is recorded on each track, fixed magnetic sound signal recording and reproducing head, means for monitoring the pictures of the video signal reproduced by said magnetic video signal recording and reproducing means, means for operating monitored pictures at slow motion to a selected position in a previously recorded video signal on the magnetic tape where editing signals are to be recorded, means responsive to operation of said stopping means for stopping the motion of said magnetic tape at the selected position, means for generating a single pulse signal, a fixed magnetic cue signal recording head, means comprising said fixed magnetic cue signal recording head for recording said single pulse signal as a cue signal on at least one marginal portion of the stopped magnetic tape, a fixed magnetic cue signal reproducing head disposed at a position which is closer to the supply reel than the position at which said fixed magnetic cue signal recording head and said fixed magnetic sound signal recording and reproducing head are disposed, means for rewinding the magnetic tape to the supply reel, means comprising said cue signal reproducing head for reproducing the recorded cue signal while the magnetic tape is being moved past said fixed magnetic cue signal reproducing head by said means for moving magnetic tape from a supply reel, means responsive to the reproduced cue signal for generating a pulse signal, relay means operated responsive to said pulse signal for closing a switch, a sound signal tape recorder means having said editing signals previously recorded therein, means for connecting said sound signal tape recorder to a power source through said closed switch, thereby energizing said sound signal tape recorder and reproducing the recorded editing signal, and sound signal recording means including said fixed magnetic sound signal recording and reproducing head for recording said editing signals reproduced from said sound signal tape recorder on at least one marginal portion of the moving magnetic tape.

3. The system defined in claim 2 wherein said signal pulse signal has a constant pulse width.

4. The system defined in claim 2 wherein said means for generating a single pulse signal comprises monostable multivibrator means, and means for triggering said monostable multivibrator means by applying a DC voltage to the input of said monostable multivibrator means through a key switch.

* * * * *